United States Patent [19]

Yazaki et al.

[11] Patent Number: 4,567,097
[45] Date of Patent: Jan. 28, 1986

[54] COMPOSITE HEAT-INSULATING MATERIAL

[75] Inventors: Takao Yazaki; Kazuhide Hattori; Takumi Matsuno; Kazuhide Hayama; Isao Ito; Yukio Saito, all of Mie, Japan

[73] Assignees: Mitsubishi Petrochemical Co., Ltd.; Mitsubishi Yuka Fine Chemical Co., both of Tokyo, Japan

[21] Appl. No.: 690,253

[22] Filed: Jan. 10, 1985

[30] Foreign Application Priority Data

Jan. 12, 1984 [JP] Japan .................................. 59-3800
Jun. 21, 1984 [JP] Japan .............................. 59-128216

[51] Int. Cl.⁴ .......................... B32B 3/26; B32B 7/12; B32B 27/04
[52] U.S. Cl. ............................. 428/317.7; 428/319.7; 428/515; 428/516; 428/519; 428/520
[58] Field of Search ............... 428/314.4, 314.8, 317.1, 428/317.7, 319.7, 319.9, 515, 516, 519, 520

[56] References Cited

U.S. PATENT DOCUMENTS

| | | | |
|---|---|---|---|
| 3,607,602 | 9/1971 | Greskiewicz | 428/317.1 |
| 3,640,838 | 2/1972 | Chow et al. | 428/319.7 |
| 3,862,880 | 1/1975 | Feldman | 428/319.9 |
| 3,911,190 | 10/1975 | Myers et al. | 428/314.4 |
| 4,416,937 | 11/1983 | Metzger | 428/317.7 |
| 4,500,597 | 2/1985 | Yazaki et al. | 428/317.7 |

Primary Examiner—William J. Van Balen
Attorney, Agent, or Firm—Oblon, Fisher, Spivak, McClelland & Maier

[57] ABSTRACT

A composite heat-insulating material having the structure that an olefin- or styrene-based resin and a urethane foam are laminated with an adhesive, said adhesive comprising (A) 20 to 100% by weight of a water-soluble or water-dispersible carboxyl group-containing polyolefin-based polymer;
(B) 0 to 80% by weight of a water-soluble polymer having an antistatic property; and
(C) 0 to 2% by weight of a fluorine-based surface active agent.

9 Claims, 2 Drawing Figures

1

COMPOSITE HEAT-INSULATING MATERIAL

FIELD OF THE INVENTION

The present invention relates to a composite heat-insulating material which is used, for example, as a lining material for the main body or door of a refrigerator. The composite heat-insulating material of the present invention is a heat-insulating material having the structure that a urethane form and a polyolefin or styrene-based resin sheet are strongly bonded together.

BACKGROUND OF THE INVENTION

The main body or door of a refrigerator is provided with a lining material produced from a sheet of a styrene-based resin such as an acrylonitrile/butadiene/styrene copolymer (ABS) by vacuum forming or pressure forming or a combination thereof (those forming methods are hereinafter referred to as "differential pressure forming"). This lining material serves to prevent corrosion of a frame of stainless steel or steel which is coated with a paint followed by baking, and also provides projections necessary for holding shelves. An attempt has been made to use a lining material made of a polypropylene having an excellent surface luster and a low degree of water absorption in place of the lining material made of ABS.

In order to increase the heat-insulating properties of a refrigerator, it has been proposed to provide a urethane foam sheet between the stainless steel plate having a baked coating of the frame and the lining material. In producing such a laminated structure, when a polyolefin-based resin sheet is used as a lining material, adhesion between the polyolefin-based resin sheet and the urethane foam sheet as a heat-insulating material must be strong. This is achieved by, for example, laminating the lining material and urethane foam sheet which had previously been subjected to differential pressure forming, with a liquid acryl or epoxy-based adhesive, thereby producing a laminated member and then press bonding the laminated member to the inner surface of the stainless steel frame having a baked coating which has been coated with an adhesive. This procedure, however, will increase production cost since it involves a plurality of steps. For this reason, it is preferred to employ an in situ fabrication method as shown in FIG. 1 that a foamable urethane solution 4 is injected into a cavity 3 formed between a mold frame 1 and a lining material 2 and then expanded and hardened to produce a composite structure that the mold frame 1, the urethane foam 4' and the lining material 2 are combined together in one body.

Other possible method is a method comprising coating an organic solvent-type adhesive on a polyolefin resin sheet, drying the adhesive and bonding the sheet to a urethane foam of a heat-insulating material. However, use of the organic solvent is not preferred from the standpoints of operation environment such as danger of fire or worker's health.

Prior to differential pressure forming of the ABS and polyolefin-based resin sheets, it is necessary to remove dust attached onto the surface thereof with cloth, for example. This problem can be overcome by introducing an antistatic agent into the sheet in the course of production thereof. In this method, however, the desired antistatic capability can be obtained only in 30 to 50 days after molding of the sheet. During this period, it is undesirably necessary to pay attention so that the sheet is not affected by dust.

SUMMARY OF THE INVENTION

As a result of extensive investigations on a coating-type adhesive composition which satisfies the above-described properties required in the in situ production of a laminated structure insulating material of urethane foam and ABS, or urethane foam and polypropylene, it has been found that a specific adhesive composition satisfies the above-described requirements.

Accordingly, an object of the present invention is to provide a composite heat-insulating material having the structure that a polyolefin-based resin or styrene-based resin sheet and a urethane foam sheet are bonded with an adhesive composition containing the following components (A), (B) and (C):

(A) 20 to 100% by weight of a water-soluble or water-dispersible polyolefin-based polymer containing a carboxyl group;

(B) 0 to 80% by weight of nitrogen atom-containing water-soluble polymer having an antistatic property;

(C) 0 to 2% by weight of a fluorine-based surface active agent.

Figure 1:
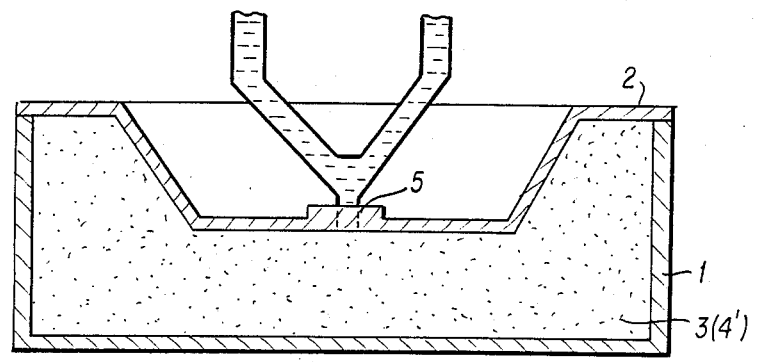
FIG. 1 is a cross sectional view illustrating an embodiment of the present invention.

1 . . . Stainless steel frame, 2 . . . Sheet for differential pressure forming (lining material), 2a and 2c . . . Coating layer, 3 . . . Cavity, 4' . . . Urethane foam, 5 . . . Injection inlet.

DETAILED DESCRIPTION OF THE INVENTION

The resin for sheet material used in the present invention includes a polyolefin-based resin such as a high density polyethylene, a low density polyethylene, a polypropylene, a hydroxyethyl acrylate-grafted polypropylene, an ethylene/propylene copolymer, an ethylene/propylene/butene copolymer, a maleic anhydride-grafted polypropylene, etc.; and a styrene-based resin such as a polystyrene, a styrene/butadiene/styrene block copolymer (SBS), an acrylonitrile/butadiene/styrene copolymer (ABS), a high impact polystyrene (HIPS), etc. These resins can be used alone or as mixtures thereof.

Stabilizers, inorganic fillers, pigments, rubbers, and the like may be added to the resins. The resulting resin composition is formed into a sheet by extruder and, if necessary and required, a corona discharge treatment is applied onto at least one surface of the sheet, thereby providing a 0.3 to 4 mm thick sheet for differential pressure forming.

The adhesive composition comprises Component (A) alone or a mixture of at least 20% by weight (solids base) of Component (A), 0 to 80% by weight of Component (B) and 0 to 2% by weight of Component (C). This adhesive is used as an aqueous solution or aqueous dispersion having a concentration of from 0.5 to 3% by weight.

In view of the antistatic property and the adhesive property to the urethane foam, it is preferred for the adhesive to be composed of a mixture of 20 to 80% by weight of Component (A), 80 to 20% by weight of Component (B) and 0.01 to 2% by weight of Component (C). If the Component (A) content is from 85 to 100% by weight, the antistatic function of the sheets is not sufficient until the sheet is subjected to thermoforming. In this case, therefore, it is necessary that the surface of the resin sheet opposite to the surface thereof to which the urethane foam is bonded must be coated with antistatic agents composed of 20 to 80% by weight of Component (A) and 80 to 20% by weight of Component (B), or antistatic agents such as anionic, cationic, amphoteric, and nonionic surface active agents (e.g., sodium laurylaminopropionate, stearyltrimethylammonium chloride, a 1-hydroxyethyl-2-undecyl-2-imidazoline/ethylene oxide adduct, a nonylphenyl/ethylene oxide adduct, and sodium laurylsulfate).

The carboxyl group-containing polyolefin-based polymer as the starting material for Component (A) can be prepared by copolymerizing unsaturated monocarboxylic acids such as acrylic acid and methacrylic acid or unsaturated polyhydric carboxylic anhydrides such as maleic anhydride, with olefins such as ethylene, or graft copolymerizing the above-described carboxylic acids onto polyolefins, or random copolymerizing unsaturated carboxylic acid esters such as alkyl (meth)acrylate with ethylene or graft copolymerizing the esters onto polyolefins followed by saponification.

Specific examples of the carboxyl group-containing polyolefin-based polymer include an ethylene/acrylic acid random copolymer, an ethylene/methacrylic acid random copolymer, a maleic anhydride-grafted ethylene/vinyl acetate copolymer and an acrylic acid-grafted polyethylene.

The carboxyl group-containing polyolefin can be solubilized or dispersed in water by the conventional methods. For example, an aqueous solution of alkali such as ammonia, alkanolamine or caustic soda is added to the carboxyl group-containing polyolefin to water solubilize or self emulsify the polyolefin or the polyolefin is dispersed in water by using other emulsifying agents or protective colloids. As a result, partially neutralized products or completely neutralized products can be produced.

Examples of the neutralized product are the commercially available products such as ZAIKTHENE A, ZAIKTHENE A-TH or ZAIKTHENE AC (ammonia neutralized product, pH: 7–10), ZAIKTHENE L (alkanolamine neutralized product, pH: 8–10), ZAIKTHENE N (caustic soda neutralized product, pH: 8–11), produced by Shin-nippon Seitetsu Kagaku Co., CHEMIPEARL S-100 produced by Mitsui Petroleum Chemical Industry Co., and COPOLENE L-4000 produced by Asahi Kasei Kogyo K.K.

Specific examples of Component (A) are ammonia salt, alkanolamine salt or alkali metal salt of an ethylene/acrylic acid copolymer.

80% by weight, preferably 60 to 20% by weight, of the neutralized product of Component (A) may be substituted with a water-soluble polymer having an antistatic function.

The nitrogen-atom containing water-soluble polymer having the antistatic function is not particularly limited and may be cationic, anionic, nonionic or amphoteric polymers. The water-soluble polymer is selected taking into consideration the ionic property so as to uniformly mix with Component (A).

Specific examples of the water-soluble polymer are a polyethyleneimine, a poly(ethyleneimine-urea), an ethyleneimine adduct of polyamine-polyamide and other nitrogen-containing cationic or amphoteric polymer. The last-described nitrogen-containing water-soluble polymer can be obtained by homopolymerizing nitrogen-containing monomers or copolymerizing the monomers with other monomers copolymerizable therewith.

Suitable examples of such nitrogen-containing monomers are shown below.

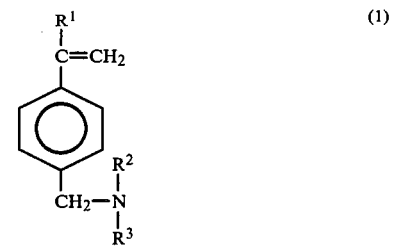

(1)

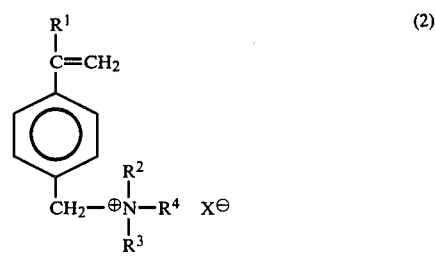

(2)

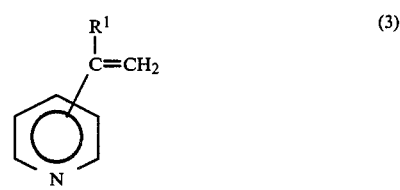

(3)

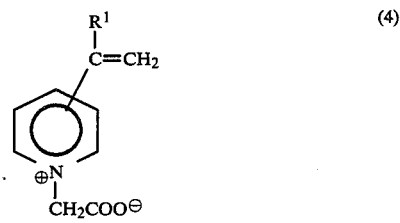

(4)

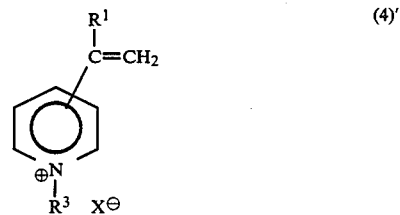

(4)'

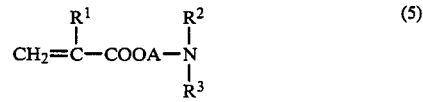

(5)

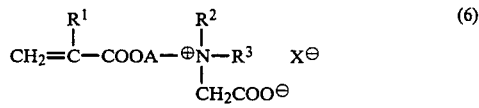

(6)

-continued

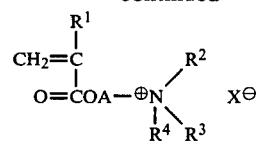 (6)'

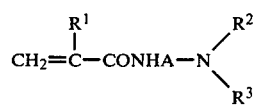 (7)

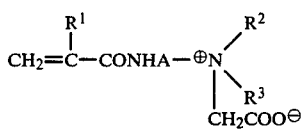 (8)

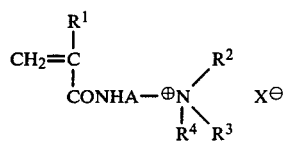 (8)'

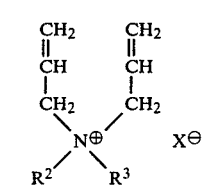 (9)

In the above formulae, $R^1$ is a hydrogen atom or a methyl group;

$R^2$ and $R^3$ are each a lower alkyl group (preferably having from 1 to 4 carbon atoms and more preferably 1 or 2 carbon atoms);

$R^4$ is a saturated or unsaturated alkyl group having from 1 to 22 carbon atoms, or a benzyl group;

$X^\ominus$ is a counter ion (e.g., halide, in particular, chloride) of quaternized $N^\oplus$; and A is an alkylene group having from 2 to 6 carbon atoms.

The nitrogen-containing water-soluble polymer having the antistatic function can be prepared by homopolymerizing the above-described quaternary nitrogen-containing monomers (2), (4), (4)', (6), (6)', (8), (8)' and (9), or by copolymerizing these quaternary nitrogen-containing monomers with other vinyl monomers. Of course, there can be employed a procedure in which the tertiary nitrogen-containing monomers (1), (3), (5) and (7) are homopolymerized or copolymerized with other monomers and then quaternized with a cationizing agent such as alkyl halide, dimethylsulfuric acid and benzyl halide monochloroacetic acid ester, or amphoterized with an amphoterizing agent such as monochloroacetic acid or its salt, propanesultone and propiolactone.

The polymer having the antistatic effect must be water-soluble. It is not desirable, however, that the polymer be excessively soluble in water. For this reason, the tertiary or quaternary nitrogen-containing polymer is desirably a copolymer with a hydrophobic monomer. Examples of these hydrophobic monomers include styrene or its derivatives resulting from substitution in the nucleus or side chain thereof, acrylic or methacrylic acid esters, and vinyl halides.

Especially suitable nitrogen-containing water-soluble polymers are acryl-based polymers prepared by copolymerizing the following components (a) to (c):

| (a) monomers (1) to (9) | 20 to 40% by weight |
|---|---|
| (b) $CH_2=\overset{R^1}{\underset{|}{C}}-COOR^5$ | 60 to 80% by weight |
| (wherein $R^1$ is H or a methyl group and $R^5$ is an alkyl group having from 1 to 18 carbon atoms) | |
| (c) hydrophobic vinyl monomer | 0 to 20% by weight |

Examples of the hydrophobic vinyl monomer are styrene, acrylonitrile, vinyl chloride, α-methyl styrene, etc.

The most suitable acryl-based polymer is a polymer comprising a monomer (a) wherein $X^\ominus$ is $Cl^\ominus$ in the above formula (6).

These water-soluble acryl-based polymers are commercially available as trade names of ST-1000, ST-1100, ST-1300 and ST-3000 by Mitsubishi Yuka Fine Co., Ltd.

The fluorine-based surface active agent as Component (C) may be cationic, anionic, nonionic or amphoteric. Examples of the agent are as follows.

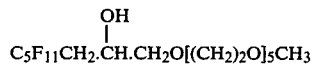

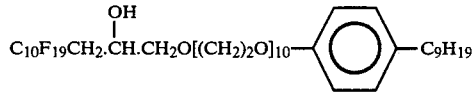

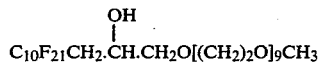

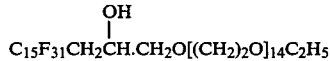

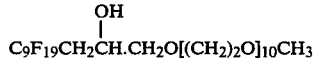

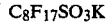

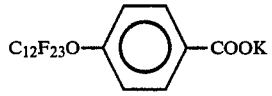

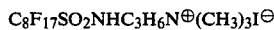

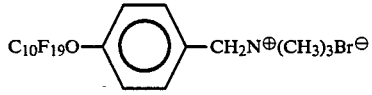

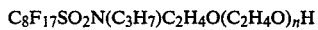

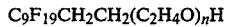

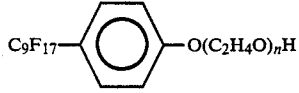

-continued (wherein n is an integer of 1 to 20)

Of those agents, anionic or amphoteric agents are preferred as compared to cationic agents, and nonionic surface active agents are most preferred.

The commercially available fluorine-based surface active agents are cationic agents of FLUORAD 134 and FLUORAD 135; nonionic agents of FLUORAD 170C, FLUORAD 430 and FLUORAD 431; and anionic agents of FLUORAD 95, FLUORAD 98 and FLUORAD 129; all agents by Sumitomo 3M, and a cationic agent of SURFLON 121 (perfluoroalkyltrimethyl ammonium salt); an amphoteric agent of SURFLON 131 (perfluoroalkyl betaine); nonionic agents of SURFLON 141 and SURFLON 145 (perfluoroalkylpolyether polyol); and anionic agents of SURFLON 111 (perfluoroalkylcarboxylic acid) and SURFLON 112 (perfluoroalkylphosphoric acid ester), all agents by Asahi Glass Co.

Those agents are used by dissolving in water, a mixed solution of water and an alcohol such as ethanol or isopropanol, or a mixed solution of water butyl cellosolve and alcohol.

Use of the fluorine-based surface active agent improves the adhesion between urethane foam and sheet.

Component (C) is used in an amount of 0.01 to 2% by weight, preferably 0.1 to 0.5% by weight.

The adhesive is used in the form of an aqueous solution or aqueous dispersion having the concentration of 0.1 to 10% by weight.

The surface of sheet opposite to the surface thereof on which the adhesive is applied is preferably coated with an antistatic agent. The antistatic agent may be the same as in the above adhesive or other antistatic agents such as the water-soluble antistatic polymer of Component (B). Further, the antistatic agent may be a blend comprising the above water-soluble antistatic polymer and antistatic agents of anionic, cationic, amphoteric or nonionic surface active agents (e.g., sodium laurylaminopropionate, stearyltrimethylammonium chloride, a 1-hydroxyethyl-2-undecyl-2-imidazoline/ethylene oxide adduct, a nonylphenyl-/ethylene oxide adduct, sodium laurylsulfate and a fluorine-based surface active agent).

Figure 2:
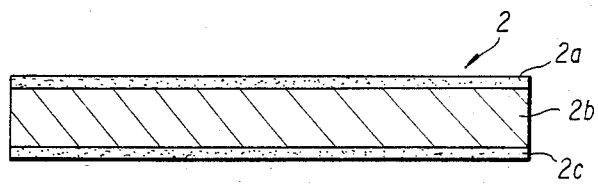
FIG. 2 is a cross sectional view of a sheet.

Each of aqueous solutions (2a, 2c) of the adhesive containing Component (A) or Components (A) and (B) and having the antistatic function are coated at least one surface of a sheet (2b) opposite to the surface which is adhered on the urethane in an amount of from 0.01 to 1.0 g/m² (solids basis) by means of, e.g., a roll, a brush, or a spray and then dried (see FIG. 2).

The thus-prepared resin sheet with the adhesive resin layers (2a, 2c) provided on both surfaces thereof or one surface which is adhered with the urethane is subjected to the conventional differential pressure forming and molded into a suitable form for use as a lining material of a refrigerator.

The sheet 2 is, if necessary after boring therein an injection inlet 5 for a urethane solution 4, placed in a stainless steel frame or aluminum mold frame 1 as the outer structure of the refrigerator as shown in FIG. 1. Then, a two pack-type expandable urethane solution, for example, is injected through the injection inlet 5 into a cavity 4 formed between the mold frame 1 and the lining material 2. On the urethane solution is expanded a composite heat-insulating lining material comprising the urethane foam 4' and the lining material 2 strongly bonded together is formed.

The present invention is described in greater detail with reference to the following examples. All parts and percents (%) are by weight.

PRODUCTION OF SHEET

Sheet Production Example 1

(i) Resin for Lustrous Layer (Surface Layer)

A crystalline propylene homopolymer (MFR: 2.0 g/10 min; boiling heptane extraction residue: 99% by weight) was used.

(ii) Resin for Deep Drawing Layer (Base Layer)

A composition of 40% by weight of a crystalline propylene/ethylene block copolymer (ethylene content: 5% by weight; MFR: 0.5 g/10 min; boiling heptane extraction residue: 98% by weight), 40% by weight of polyethylene (density: 0.950 g/cm³; MFR: 0.6 g/10 min) and 20% by weight of talc having a particle diameter of 1.5μ was kneaded in an extruder and extruded in the form of strand. The strand was cut to form pellets.

The above pellets of the resin (ii) were fed to a two-layer multimanifold die (width: 700 mm) at 200° to 270° C. by means of an extruder (diameter of a screw: 90 mm), and the resin (i) was fed to the same die as above at 230° to 270° C. by means of an extruder (diameter of a screw: 40 mm). The temperature of the die was set at 230° C. A molten two-ply sheet extruded from the die was cooled and solidified successively on three rolls having a width of 700 mm and then subjected to a corona discharge treatment to produce a sheet for vacuum forming. The temperature of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of the lustrous layer was 0.25 mm; and the thickness of the deep drawing layer was 1.35 mm.

Sheet Production Example 2

Polypropylene (trade name: Mitsubishi Norblen MA-8, produced by Mitsubishi Petrochemical Co., Ltd.) was extruded in a sheet form at 230° C. and then subjected to a corona discharge treatment to produce a 1.6 mm thick sheet.

Sheet Production Example 3

An ABS resin (trade name: Toughlex 157, produced by Mitsubishi Montsant Kasei Co., Ltd.) was extruded in a sheet form at 220° C. to produce a 1.6 mm thick sheet.

Sheet Production Example 4

| | Amount (parts) |
|---|---|
| Polypropylene (trade name: Mitsubishi Norblen MH-6 produced by Mitsubishi Petrochemical Co., Ltd.) | 35 |
| High density polyethylene (trade name: Yukalon Hard EY-40 produced by Mitsubishi Petrochemical Co., Ltd.) | 25 |
| Styrene/butadiene/styrene copolymer | 12 |
| Talc | 24 |
| Titanium oxide | 4 |

A 1.6 mm thick sheet was produced in the same manner as in Sheet Production Example 2 except that polypropylene was replaced by a resin composition consisting of the above ingredients.

Sheet Production Example 5

(i) Resin for Lustrous Layer (Surface Layer)

A crystalline propylene homopolymer (MFR: 2.0 g/10 min; boiling heptane extraction residue: 99% by weight) was used.

(ii) Resin for Deep Drawing Layer (Base Layer)

|  | Amount (parts) |
|---|---|
| Polypropylene (Mitsubishi Norblen MH-6) | 25 |
| High density polyethylene (Yukalon Hard EY-40) | 15 |
| Styrene/butadiene/styrene block copolymer | 12 |
| Calcium carbonate | 40 |
| Polystyrene | 8 |

The above resin (ii) was fed to a three-layer multimanifold die (width: 700 mm) at 230° C. by means of an extruder (diameter of a screw: 90 mm), and the resin (i) was fed to the same die as above at 230° C. by means of an extruder (diameter of a screw: 40 mm). The temperature of the die was set at 230° C. A molten three-ply sheet extruded from the die was cooled and solidified successively on three rolls having a width of 700 mm and then subjected to a corona discharge treatment to produce a sheet for vacuum forming. The temperatures of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of each lustrous layer was 0.2 mm; and the thickness of the deep drawing layer was 1.2 mm.

Sheet Production Example 6

(i) Resin for Lustrous Layer (Surface Layer)

A crystalline propylene homopolymer (MFR: 2.0 g/10 min; boiling heptane extraction residue: 99% by weight) was used.

(ii) Resin for Deep Drawing Layer (Urethane Bonding Layer)

|  | Amount (parts) |
|---|---|
| Polypropylene (Mitsubishi Norblen MH-6) | 76 |
| Ethylene/acrylic acid random copolymer | 10 |
| Styrene/butadiene/styrene copolymer | 4 |
| Polystyrene | 10 |

The above resin (ii) was fed to a two-layer multimanifold die (width: 700 mm) at 230° C. by means of an extruder (diameter of a screw: 90 mm), and the resin (i) was fed to the same die as above at 230° C. by means of an extruder (diameter of a screw: 40 mm). The temperature of the die was set at 230° C. A molten two-ply sheet extruded from the die was cooled and solidified successively on three rolls having a width of 700 mm and then subjected to a corona discharge treatment to produce a sheet for vacuum forming. The temperature of the three rolls were as follows: 80° C. for the nearest roll relative to the die; 95° C. for the intermediate roll; and 100° C. for the farthest roll. The rotation speed of the rolls was 1.5 m/min. The total thickness of the sheet was 1.6 mm; the thickness of each lustrous layer was 0.2 mm; and the thickness of the deep drawing layer was 1.2 mm.

Sheet Production Example 7

A reaction vessel having an inner volume of 200 l was charged with 5 kg of polypropylene (MFR: 0.8 g/10 min; density: 0.91 g/cm$^3$) and 90 l of xylene. The system is replaced with nitrogen and the temperature was raised to 120° C. while stirring to dissolve the polypropylene in xylene.

Separately, 400 g of benzoyl peroxide and 1 kg of 2-hydroxypropyl methacrylate were dissolved in 10 l of xylene and the resulting mixture was fed to the above reaction vessel over 2 hours. After completion of feeding, the mixture was maintained at 120° C. for 5 hours while stirring to complete the polymerization. After completion of the reaction, the reaction mixture was cooled to 60° C. and the reaction product was precipitated using a large amount of acetone. The reaction product was filtered off, sufficiently washed with acetone and dried with a vacuum drier to obtain 2-hydroxypropyl methacrylate-modified polypropylene. As a result of measurement by infrared spectrum analysis, the 2-hydroxypropyl methacrylate content in the product was 1.4% by weight.

100 parts of the modified polypropylene thus obtained, 0.1 part by weight of 2,6-di-t-butyl-p-cresol and 0.05 part by weight of calcium stearate were mixed with Henshel mixer. The mixture is extruded by means of an extruder having L/D=28 at 230° C., cooled with water and pelletized. The modified polypropylene pellets thus obtained (MFR: 4.2/10 min) were extruded into a sheet form, subjected to a corona discharge treatment and cooled to produce a 1.6 mm thick sheet.

Preparation of Acryl-Based Polymer of the Component (B)

A four-necked flask equipped with a stirrer, a reflux condenser, a thermometer and a dropping funnel was charged with 80 parts (0.5 mol) of N,N-dimethylaminoethyl methacrylate, 50 parts (0.5 mol) of methyl methacrylate and 200 parts of isopropyl alcohol. After displacement with nitrogen gas, 0.9 part of 2,2'-azobisisobutyronitrile was added as a polymerization initiator, and polymerization was conducted at 80° C. for 4 hours.

To the reaction mixture was added 60 parts of sodium monochloroacetate, which were then reacted at 80° C. for 6 hours to make the polymer amphoteric. Thereafter, water was added while distilling off isopropyl alcohol to obtain an aqueous solution having a solids content of 35%.

The thus-prepared acryl-based polymer (hereinafter referred to as "ST") had the following molecular chain:

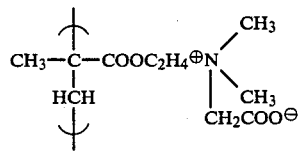

EXAMPLE 1

A 1% aqueous dispersion of a mixed polymer of 50% of the acryl-based polymer prepared above (i.e., ST)

and 50% of a caboxyl group-containing polyolefin-based aqueous emulsion ("ZAIKTHENE AC", trade name, produced by Seitetsu Kagaku Kogyo K.K.) was coated on both sides of the two-layer structure sheet produced in Sheet Production Example 1 each in an amount of 0.3 g/m² (solids basis) and the coatings were dried.

The surface resistivity of the sheet was $2.0 \times 10^9$ Ω·cm.

The sheet was introduced in an oven maintained at about 220° C. and was subjected to plug assist molding using a pressure-air of 5.0 kg/cm² and a vacuum of −600 mm Hg by means of a vacuum/pressure molding machine.

An injection inlet was bored in the above-molded sheet which was then placed in a stainless steel frame as the main body of a refrigerator. Into a cavity formed between the frame and the sheet was injected through the injection inlet a two pack-type expandable urethane solution, HM-1510, produced by Polyurethane Kagaku Kasei Co., Ltd. In 10 seconds after the injection of the urethane solution, it started to expand and in 1 minute the cavity was completely filled with a urethane foam. The density of the urethane foam was 0.05 g/cm³.

After 24 hours a test piece was cut out of the sheet with the urethane foam bonded thereto and was measured for the adhesion between the sheet and the urethane foam. For comparison, a sheet was produced in the same manner as above except that urethane bonding was not applied. Also, a test piece was cut out of the sheet and measured for the surface resistivity and attachment of ash. The results are shown below.

Surface resistivity*: $2.5 \times 10^{11}$ Ω·cm
Attachment of ash: none
Adhesion between urethane and sheet: good (o)
Antiblocking property**: good (o)
*Measured under conditions of 20° C. and 60% RH.

**Two sheets were superposed and were allowed to stand under conditions of 20° C. and 60% RH under a load of 50 g/cm² for 24 hours. Then, adhesion between the sheets (blocking) were examined.
Good (o) . . . No blocking
Normal (Δ) . . . Some blocking is observed but the sheets can be easily peeled apart each other with hands.
Bad (×) . . . Serious blocking

EXAMPLES 2 TO 8 AND COMPARATIVE EXAMPLE 1

Laminates of urethane foam/resin sheet for heat-insulating materials were produced in the same manner as in Example 1 except that the coating material was changed as shown in Table 1.

These materials were evaluated in the same manner as in Example 1. The results are shown in Table 1.

The rating scale was as follows:
Attachment of Ash:
× . . . Attachment occurs at a height of 5 cm or more.
Δ . . . Attachment occurs at a height of from 3 to 5 cm.
o . . . Attachment occurs at a height of 3 cm or less or no attachment occurs.
Adhesion of Urethane to Sheet:
× × . . . The sheet and urethane foam can be easily peeled apart each other.
× . . . The sheet and urethane foam can be peeled apart each other but with some difficulty.
Δ . . . Partial peeling of the urethane foam itself occurs.
o . . . Entire peeling of the urethane foam itself occurs.

TABLE 1

| | Composition of Coating Material (%) | | Sheet before Differential Pressure Forming | |
|---|---|---|---|---|
| | Urethane Bonding Layer Side (Reverse Side) | Lustrous Layer Side (Observe Side) | Surface Resistivity (Ω · cm) | |
| | | | Reverse Side | Observe Side |
| Example 1 | ZAIKTHENE AC/ST = 50/50 | EAIKTHENE AC/ST = 50/50 | $2.0 \times 10^9$ | $2.0 \times 10^9$ |
| Example 2 | ZAIKTHENE AC/ST = 30/70 | EAIKTHENE AC/ST = 30/70 | $3.5 \times 10^8$ | $3.5 \times 10^8$ |
| Example 3 | ZAIKTHENE AC/ST = 70/30 | EAIKTHENE AC/ST = 70/30 | $4.4 \times 10^{10}$ | $4.4 \times 10^{10}$ |
| Example 4 | ZAIKTHENE AC/ST = 50/50 | — | $1.7 \times 10^9$ | $>2.0 \times 10^{12}$ |
| Example 5 | ZAIKTHENE AC | ST | $>2.0 \times 10^{12}$ | $6.0 \times 10^9$ |
| Example 6 | ZAIKTHENE AC/Oligo Z*¹ = 50/50 | — | $8.5 \times 10^8$ | $>2.0 \times 10^{12}$ |
| Example 7 | CHEMIPEARL S-100*²/ST-1000*³ = 50/50 | — | $3.5 \times 10^9$ | $3.5 \times 10^9$ |
| Example 8 | COPOLENE L-4000*⁴/ST-1000 = 50/50 | — | $6.5 \times 10^9$ | $6.5 \times 10^9$ |
| Comparative Example 1 | — | AC/ST = 50/50 | $>2.0 \times 10^{12}$ | $2.5 \times 10^9$ |

| | Laminated Heat-Insulating Material | | | | |
|---|---|---|---|---|---|
| | Surface Resistivity (Ω · cm) | | Attachment of Ash | | Adhesion |
| | Reverse Side | Observe Side | Reverse Side | Observe Side | Reverse Side |
| Example 1 | $2.5 \times 10^{11}$ | $3.2 \times 10^{11}$ | o | o | o |
| Example 2 | $9.0 \times 10^{10}$ | $1.0 \times 10^{11}$ | o | o | o |
| Example 3 | $5.2 \times 10^{11}$ | $3.5 \times 10^{11}$ | o | o | o |
| Example 4 | $3.4 \times 10^{11}$ | $>2.0 \times 10^{12}$ | o | x | o |
| Example 5 | $>2.0 \times 10^{12}$ | $4.3 \times 10^{11}$ | x | o | o |
| Example 6 | $5.5 \times 10^{11}$ | $>2.0 \times 10^{12}$ | o | x | o |
| Example 7 | $6.0 \times 10^{11}$ | $6.0 \times 10^{11}$ | o | x | o~Δ |
| Example 8 | $9.0 \times 10^{11}$ | $9.0 \times 10^{11}$ | o | x | o |
| Comparative Example 1 | $>2.0 \times 10^{12}$ | $4.0 \times 10^{11}$ | x | o | x |

Notes
Trade name
*¹Styrene-based anionic polymer by Tomoegawa Seishi Co.
*²Carboxyl group-containing polyolefin by Mitsui Petroleum Chemical Co.
*³Acryl-based amphoteric polymer by Mitsubishi Yuka Fine Co.
*⁴Carboxyl group-containing polyolefin by Asahi Dow Co.

EXAMPLES 9 TO 13

Laminates of urethane foam/sheet for heat-insulating materials were produced in the same manner as in Example 1 except that the sheets obtained in Sheet Production Examples 2 to 5 were used in place of the sheet obtained in Sheet Production Example 1.

Physical properties of the materials are shown in Table 2.

Kasei Co., Ltd. In 10 seconds after the injection of the urethane solution, it started to expand and in 1 minute the cavity was completely filled with a urethane foam. The density of the urethane foam was 0.05 g/cm$^3$. This procedure was repeated 20 times to obtain 20 samples.

TABLE 2

| | Resin Sheet | Composition of Coating Material | | Sheet before Differential Pressure Forming Surface Resistivity ($\Omega \cdot$ cm) | |
|---|---|---|---|---|---|
| | | Urethane Bonding Layer Side (Reverse Side) | Lustrous Layer Side (Observe Side) | Reverse Side | Observe Side |
| Example 9 | Production Example 2 | ZAIKTHENE AC/ST-1000 = 50/50 | ST-1100 | 2.0~5.0 × 10$^9$ | 1.0~2.0 × 10$^8$ |
| Example 10 | Production Example 3 | ZAIKTHENE AC/ST-1000 = 50/50 | ST-1100 | 2.0~5.0 × 10$^9$ | 1.0~2.0 × 10$^8$ |
| Example 11 | Production Example 4 | ZAIKTHENE AC/ST-1000 = 50/50 | ST-1100 | 2.0~5.0 × 10$^9$ | 1.0~2.0 × 10$^8$ |
| Example 12 | Production Example 5 | ZAIKTHENE AC/ST-1000 = 50/50 | ST-1100 | 2.0~5.0 × 10$^9$ | 1.0~2.0 × 10$^8$ |
| Example 13 | Production Example 5 | ZAIKTHENE AC/ST-1000 = 50/50 | Electrostripper QN*$^5$ | 2.0~5.0 × 10$^9$ | 9.5 × 10$^{11}$ |

| | Laminated Heat-Insulating Material | | | | |
|---|---|---|---|---|---|
| | Surface Resistivity ($\Omega \cdot$ cm) | | Attachment of Ash | | Adhesion |
| | Reverse Side | Observe Side | Reverse Side | Observe Side | Reverse Side |
| Example 9 | 1.0~6.0 × 10$^{11}$ | 7.0 × 10$^{10}$~2.0 × 10$^{11}$ | o | o | o |
| Example 10 | 1.0~6.0 × 10$^{11}$ | 7.0 × 10$^{10}$~2.0 × 10$^{11}$ | o | o | o |
| Example 11 | 1.0~6.0 × 10$^{11}$ | 7.0 × 10$^{10}$~2.0 × 10$^{11}$ | o | o | o |
| Example 12 | 1.0~6.0 × 10$^{11}$ | 7.0 × 10$^{10}$~2.0 × 10$^{11}$ | o | o | o |
| Example 13 | 1.0~6.0 × 10$^{11}$ | 9.5 × 10$^{11}$ | o | Δ | o |

*$^5$Trade name: Cationic surface active agent produced by Kao Soap Co.

EXAMPLE 14

A 4% aqueous dispersion prepared by adding 0.5 part (solids basis) of a cationic fluorine-based surface active agent "FLUORAD FC-430" (trade name, produced by Sumitomo 3M, viscosity (25° C.): 15,000 cps, specific gravity: 1.1) to 100 parts (solids basis) of an ammonia neutralized product of a carboxyl group-containing polyolefin "ZAIKTHENE A-TH" (produced by Shin-Nippon Seitetsu Kagaku K.K., solids concentration: about 30%, pH: about 8) was coated on both sides of the two-layer structure sheet obtained in Sheet Production Example 1 each in an amount of 0.6 g/m$^2$ (solids basis) and then dried.

The sheet was introduced in an oven maintained at about 230° C. and was subjected to plug assist molding (drawing ratio H/D=1/1) using an air-pressure of 5.0 kg/cm$^2$ and a vacuum of −600 mm Hg by means of a vacuum/pressure molding machine.

An injection inlet was bored in the above-molded sheet which was then placed in a stainless steel frame as the main body of a refrigerator. Into a cavity formed between the frame and the sheet was injected through the injection inlet a two pack-type expandable urethane solution, HM-1510, produced by Polyurethane Kagaku After 24 hours a test piece was cut out of the sheet with the urethane foam bonded thereto and was measured for the adhesion between the sheet and the urethane foam. For comparison, a sheet was produced in the same manner as above except that urethane bonding was not applied. Also, a test piece was cut out of the sheet and measured for the attachment of ash. Adhesion:

After the urethane foam is peeled off from the test piece by hand, a cross cut test is conducted in the manner that eleven longitudinal and horizontal cutting traces are provided by knife on the surface of the sheet having residual urethane to form 100 squares, and an adhesive tape is adhered thereto and rapidly peeled from the sheet to observe the percentage of the urethane unpeeled.

EXAMPLES 15 TO 24 AND COMPARATIVE EXAMPLE 2

Laminates of urethane foam/sheet for heat-insulating materials were produced in the same manner as in Example 14 except that the coating material was changed as shown in Table 3.

These materials were evaluated in the same manner as in Example 14. The results are shown in Table 3.

TABLE 3

| | Adhesive | | | | | | | |
|---|---|---|---|---|---|---|---|---|
| | Neutralized Product of Carboxyl Group-Containing Polyolefin | | Surface Active Agent | | Antistatic Polymer | | Concentration (solid basis) (%) | Coating Amount (g/m$^2$) |
| | Type | Amount (parts) | Type | Amount (parts) | Type | Amount (parts) | | |
| Example 14 | ZAIKTHENE AT-H | 100 | FLUORAD FC-430 | 0.5 | — | — | 4 | 0.6 |
| Example 15 | ZAIKTHENE AT-H | 100 | FLUORAD FC-430 | 0.05 | — | — | 4 | 0.6 |
| Example 16 | ZAIKTHENE AT-H | 80 | FLUORAD FC-430 | 0.2 | ST | 20 | 4 | 0.6 |
| Example 17 | ZAIKTHENE | 50 | FLUORAD | 0.2 | ST | 50 | 4 | 0.3 |

TABLE 3-continued

|  |  |  |  |  |  |  |  |  |
|---|---|---|---|---|---|---|---|---|
| Example 18 | ZAIKTHENE AT-H | 100 | SURFLON 113 FC-430 | 0.05 | — | — | 2 | 0.3 |
| Example 19 | ZAIKTHENE A | 100 | FLUORAD FC-430 | 0.5 | — | — | 4 | 0.6 |
| Example 20 | ZAIKTHENE N | 100 | FLUORAD FC-430 | 0.05 | — | — | 4 | 0.6 |
| Example 21 | ZAIKTHENE L | 100 | FLUORAD FC-430 | 0.2 | — | — | 4 | 0.6 |
| Example 22 | ZAIKTHENE AC | 100 | FLUORAD FC-430 | 0.2 | — | — | 4 | 0.6 |
| Example 23 | ZAIKTHENE AT-H | 70 | FLUORAD FC-430 | 0.2 | ST-1100 | 30 | 4 | 0.6 |
| Comparative Example 2 | — | — | FLUORAD FC-430 | 0.5 | ST | 100 | 4 | 0.6 |
| Example 24 | ZAIKTHENE AT-H | 100 | SURFLON 131 | 0.5 | — | — | 4 | 0.6 |

|  | Differential Pressure Forming Property of Resin Sheet | | Composite Heat-Insulating Material | | |
|---|---|---|---|---|---|
|  | | | Attachment of Ash on Sheet | Urethane Foam Adhesion (%) | |
|  | Mold Releasing Property | Plug Releasing Property | Surface | Flat Portion | Corner Portion |
| Example 14 | Good | Good | Δ | 100 | 100 |
| Example 15 | Good | Good | x | 100 | 92 |
| Example 16 | Excellent | Excellent | o | 100 | 95 |
| Example 17 | Excellent | Excellent | o | 100 | 90 |
| Example 18 | Good | Normal | x | 100 | 90 |
| Example 19 | Good | Normal | Δ | 100 | 92 |
| Example 20 | Good | Good | Δ | 100 | 90 |
| Example 21 | Good | Normal | Δ | 100 | 90 |
| Example 22 | Good | Normal | Δ | 100 | 98 |
| Example 23 | Excellent | Excellent | o | 100 | 94 |
| Comparative Example 2 | Excellent | Excellent | o | 55 | 34 |
| Example 24 | Good | Good | Δ | 100 | 100 |

EXAMPLES 25 TO 28

Laminates of urethane foam/sheet for heat-insulating materials were produced in the same manner as in Example 14 except that the sheets obtained in Sheet Production Examples 2 to 5 were used in place of the sheet obtained in Sheet Production Example 1 and the coating material at the sheet surface side was changed to "ST-1100".

Physical properties of the materials are shown in Table 6.

TABLE 4

|  | Resin Sheet | Coating Material | | Differential Pressure Forming Property of Resin Sheet | | Compositie Heat-Insulating Material | | |
|---|---|---|---|---|---|---|---|---|
|  | | Urethane Bonding Layer Side (Reverse Side) (parts) | Lustrous Layer Side (Observe Side) | Mold Releasing Property | Plug Releasing Property | Attachment of Ash of Sheet Surface | Urethane Foam Adhesion (%) | |
|  | | | | | | | Flat Portion | Corner Portion |
| Example 25 | Production Example 2 | ZAIKTHENE AT-H(100) FLUORAD FC-430(0.5) | ST-1100 | Good | Excellent | o | 100 | 100 |
| Example 26 | Production Example 3 | ZAIKTHENE AT-H(100) FLUORAD FC-430(0.5) | ST-100 | Good | Excellent | o | 100 | 100 |
| Example 27 | Production Example 4 | ZAIKTHENE AT-H(100) FLUORAD FC-430(0.5) | ST-100 | Good | Excellent | o | 100 | 100 |
| Example 28 | Production Example 5 | ZAIKTHENE AT-H(100) FLUORAD FC-430(0.5) | ST-1100 | Good | Excellent | o | 100 | 100 |

EXAMPLE 29

A 4% aqueous dispersion prepared by adding 0.5 part (solids basis) of a cationic fluorine-based surface active agent "FLUORAD FC-430" (trade name, produced by Sumitomo 3M, viscosity (25° C.): 15,000 cps, specific gravity: 1.1) to 100 parts (solids basis) of an ammonia neutralized product of carboxyl group-containing polyolefin "ZAIKTHENE A-TH" (produced by Shin-Nippon Seitetsu Kagaku, K.K., solids concentration: about 30%, pH: about 8) was coated on both sides of the two-layer structure sheet obtained in Sheet Production Example 6 each in an amount of 0.6 g/m² (solids basis) and then dried.

The sheet was introduced in an oven maintained at about 230° C. and was subjected to plug assist molding (drawing ratio H/D=1/1) using an air-pressure of 5.0 kg/cm² and a vacuum of −600 mm Hg by means of a vacuum/pressure molding machine.

An injection inlet was bored in the above-molded sheet which was then placed in a stainless steel frame as the main body of a refrigerator. Into a cavity formed between the frame and the sheet was injected through the injection inlet a two pack-type expandable urethane solution, HM-1510, produced by Polyurethane Kagaku Kasei Co., Ltd. In 10 seconds after the injection of the urethane solution, it started to expand and in 1 minute the cavity was completely filled with a urethane foam. The density of the urethane foam was 0.05 g/cm³. This procedure was repeated 20 times to obtain 20 samples.

After 24 hours the flat portion and corner portion of the sheet to which the urethane foam was bonded were cut and the adhesion between the sheet and the urethane foam was measured by the cross cut test. As a result, the adhesion was 100% at the flat portion and 100% at the corner portion.

For comparison, a sheet was produced in the same manner as above except that urethane bonding was not applied. A test piece was cut out of the sheet and measured for the attachment of ash. As a result, attachment of the ash did not occur at the height of 1 m.

EXAMPLE 30

A 4% aqueous dispersion prepared by adding 0.5 part (solids basis) of a cationic fluorine-based surface active agent "FLUORAD FC-430" (trade name, produced by Sumitomo 3M, viscosity (25° C.): 15,000 cps, specific gravity: 1.1) to 100 parts (solids basis) of an ammonia neutralized product of a carboxyl group-containing polyolefin "ZAIKTHENE A-TH" (produced by Shin-Nippon Seitetsu Kagaku K.K., solids concentration: about 30%, pH: about 8) was coated on both sides of the two-layer structure sheet obtained in Sheet Production Example 7 each in an amount of 0.6 g/m² (solids basis) and then dried.

The sheet was introduced in an oven maintained at about 230° C. and was subjected to plug assist molding (drawing ratio H/D=1/1) using an air-pressure of 5.0 kg/cm² and a vacuum of −600 mm Hg by means of a vacuum/pressure molding machine.

An injection inlet was bored in the above-molded sheet which was then placed in a stainless steel frame as the main body of a refrigerator. Into a cavity formed between the frame and the sheet was injected through the injection inlet a two pack-type expandable urethane solution, HM-1510, produced by Polyurethane Kagaku Kasei Co., Ltd. In 10 seconds after the injection of the urethane solution, it started to expand and in 1 minute the cavity was completely filled with a urethane foam. The density of the urethane foam was 0.05 g/cm³. This procedure was repeated 20 times to obtain 20 samples.

After 24 hours the flat portion and corner portion of the sheet to which the urethane foam was bonded were cut and the adhesion between the sheet and the urethane foam was measured.

For comparison, a sheet was produced in the same manner as above except that urethane bonding was not applied. A test piece was cut out of the sheet and measured for the attachment of ash.

The results obtained are shown in Table 5.

EXAMPLES 31 TO 43

Laminates of urethane foam/sheet for heat-insulating materials were produced in the same manner as in Example 25 except that the coating materials were changed as shown in Table 5.

Those laminates were evaluated in the same manner as in Example 25. The results are shown in Table 5.

TABLE 5

| | Adhesive | | | | | | | |
|---|---|---|---|---|---|---|---|---|
| | Neutralized Product of Carboxyl Group-Containing Polyolefin | | Surface Active Agent | | Antistatic Polymer | | Concentration (Solid Basis) (%) | Coating Amount (g/m²) |
| | Type | Amount (parts) | Type | Amount (parts) | Type | Amount (parts) | | |
| Example 30 | ZAIKTHENE AT-H | 100 | FLUORAD FC-430 | 0.5 | — | — | 4 | 0.6 |
| Example 31 | ZAIKTHENE AT-H | 100 | FLUORAD FC-430 | 0.2 | — | — | 4 | 0.6 |
| Example 32 | ZAIKTHENE AT-H | 80 | FLUORAD FC-430 | 0.2 | ST | 20 | 4 | 0.6 |
| Example 33 | ZAIKTHENE AT-H | 50 | FLUORAD FC-430 | 0.5 | ST | 50 | 4 | 0.6 |
| Example 34 | ZAIKTHENE A | 100 | — | — | — | — | 4 | 0.6 |
| Example 35 | ZAIKTHENE A | 100 | SURFLON 113 | 0.5 | — | — | 4 | 0.6 |
| Example 36 | ZAIKTHENE N | 100 | FLUORAD FC-430 | 0.5 | — | — | 4 | 0.6 |
| Example 37 | ZAIKTHENE L | 100 | FLUORAD FC-430 | 0.2 | — | — | 4 | 0.6 |
| Example 38 | ZAIKTHENE AC | 100 | FLUORAD FC-430 | 0.2 | — | — | 4 | 0.6 |
| Example 39 | ZAIKTHENE AC | 80 | FLUORAD FC-430 | 0.5 | ST-1100 | 20 | 4 | 0.6 |
| Example 40 | ZAIKTHENE AT-H | 100 | SURFLON 131 | 0.5 | — | — | 4 | 0.6 |
| Example 41 | ZAIKTHENE A | 80 | SURFLON 113 | 0.5 | ST | 20 | 4 | 0.6 |
| Example 42 | ZAIKTHENE AT-H | 30 | FLUORAD FC-430 | 0.5 | ST | 70 | 4 | 0.6 |
| Example 43 | ZAIKTHENE AT-H | 100 | FLUORAD FC-430 | 0.2 | — | — | 2 | 0.3 |

| | Differential Pressure Forming Property of Resin Sheet | | Composite Heat-Insulating Material | | |
|---|---|---|---|---|---|
| | | | Attachment of Ash on Sheet Surface | Urethane Foam Adhesion (%) | |
| | Mold Releasing Property | Plug Releasing Property | | Flat Portion | Corner Portion |
| Example 30 | Good | Good | Δ | 100 | 100 |
| Example 31 | Good | Good | Δ | 100 | 100 |
| Example 32 | Excellent | Excellent | o | 100 | 100 |
| Example 33 | Excellent | Excellent | o | 100 | 95 |

TABLE 5-continued

| | | | | | |
|---|---|---|---|---|---|
| Example 34 | Poor | Poor*6 | x | 100 | 98 |
| Example 35 | Good | Good | Δ | 100 | 100 |
| Example 36 | Good | Good | Δ | 100 | 100 |
| Example 37 | Good | Good | Δ | 100 | 100 |
| Example 38 | Good | Good | Δ | 100 | 100 |
| Example 39 | Excellent | Excellent | o | 100 | 98 |
| Example 40 | Good | Good | Δ | 100 | 100 |
| Example 41 | Excellent | Excellent | o | 100 | 97 |
| Example 42 | Excellent | Excellent | o | 96 | 80 |
| Example 43 | Good | Good | Δ | 100 | 100 |

*6 When the plug separated, a portion of the sheet adhered on the plug.

While the invention has been described in detail and with reference to specific embodiments thereof, it will be apparent to one skilled in the art that various changes and modifications can be made therein without departing from the spirit and scope thereof.

What is claimed is:

1. A composite heat-insulating material having the structure that an olefin- or styrene-based resin and a urethane foam are laminated with an adhesive, said adhesive comprising
   (A) 20 to 100% by weight of a water-soluble or water-dispersible carboxyl group-containing polyolefin-based polymer;
   (B) 0 to 80% by weight of a nitrogen-atom containing water-soluble polymer having an antistatic property; and
   (C) 0 to 2% by weight of a fluorine-based surface active agent.

2. The composite heat-insulating material of claim 1, wherein the adhesive comprises 20 to 80% by weight of Component (A) and 80 to 20% by weight of Component (B).

3. The composite heat-insulating material of claim 1, wherein the adhesive comprises 20 to 80% by weight of Component (A), 80 to 20% by weight of Component (B) and 0.1 to 2% by weight of Component (C).

4. The composite heat-insulating material of claim 1, wherein the Component (A) is an ammonia salt, alkanolamine salt or alkali metal salt of an ethylene/acrylic acid copolymer.

5. The composite heat-insulating material of claim 1, wherein the Component (B) is selected from the group consisting of polyethyleneimine, poly(ethyleneimine/urea), ethyleneimine adduct of polyaminepolyamide and nitrogen atom-containing cationic or amphoteric polymer.

6. The composite heat-insulating material of claim 1, wherein the Component (B) is an amphoteric compound derived by modification with an amphoterizing agent of a tertiary nitrogen atom of a polymer comprising:
   (a) 20 to 40% by weight of a monomer represented by the formula:

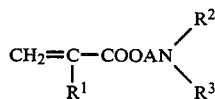

(b) 60 to 80% by weight of a monomer represented by the formula:

$$CH_2=C-COOR^5$$
$$\phantom{CH_2=C-}|$$
$$\phantom{CH_2=C-}R^1$$

(c) 0 to 20% by weight of other hydrophobic vinyl monomer,
   wherein $R^1$ is H or $CH_3$, $R^2$ and $R^3$ are each H or an alkyl group having from 1 to 2 carbon atoms, $R^5$ is an alkyl group having from 1 to 18 carbon atoms, and A is an alkylene group having from 2 to 6 carbon atoms.

7. The composite heat-insulating material of claim 1, wherein the fluorine-based surface active agent is a nonionic surface active agent.

8. The composite heat-insulating material of claim 1, wherein the fluorine-based surface active agent is selected from the group consisting of

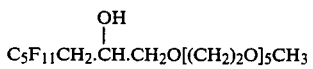

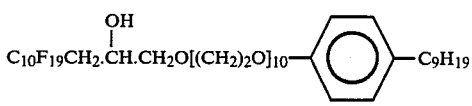

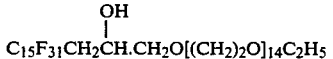

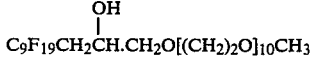

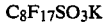

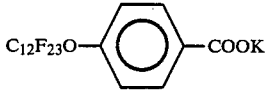

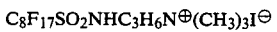

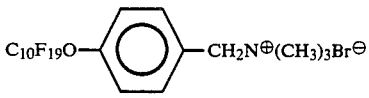

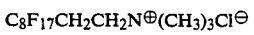

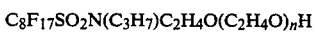

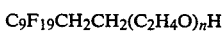

-continued

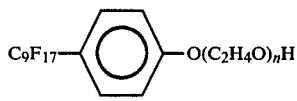

(wherein n is an integer of 1 to 20).

9. The composite heat-insulating material of claim 1, wherein the polyolefin- or styrene-based resin is made of one or more of high density polyethylene, low density polyethylene, polypropylene, hydroxyethylacrylate-grafted polypropylene, ethylene/propylene copolymer, ethylene/propylene/butene copolymer, maleic anhydride-grafted polypropylene, polystyrene, styrene/butadiene/styrene block copolymer, acrylonitrile/butadiene/styrene copolymer and high impact polystyrene.

* * * * *